(12) United States Patent
Bienas et al.

(10) Patent No.: US 10,985,866 B2
(45) Date of Patent: Apr. 20, 2021

(54) MOBILE COMMUNICATION TRANSMISSION USING FLEXIBLE FRAME STRUCTURE WITH VARIABLE MCS AND TTI LENGTH

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

(21) Appl. No.: 16/345,524

(22) PCT Filed: Dec. 21, 2017

(86) PCT No.: PCT/EP2017/084220
§ 371 (c)(1),
(2) Date: Apr. 26, 2019

(87) PCT Pub. No.: WO2018/115352
PCT Pub. Date: Jun. 28, 2018

(65) Prior Publication Data
US 2019/0305878 A1    Oct. 3, 2019

(30) Foreign Application Priority Data
Dec. 21, 2016    (EP) .................... 16205738

(51) Int. Cl.
*H04L 1/00*    (2006.01)
*H04L 1/18*    (2006.01)
(Continued)

(52) U.S. Cl.
CPC .......... *H04L 1/0013* (2013.01); *H04L 1/0025* (2013.01); *H04L 1/0027* (2013.01);
(Continued)

(58) Field of Classification Search
CPC ......... H04W 88/06; H03C 3/403; H04L 5/143
See application file for complete search history.

(56) References Cited

U.S. PATENT DOCUMENTS

2002/0111187 A1*  8/2002  Harada ................ H04W 88/06
                                                        455/553.1
2006/0072646 A1*  4/2006  Feher .................. H04L 25/4902
                                                        375/130
(Continued)

FOREIGN PATENT DOCUMENTS

EP    2015601 A1    1/2009
RU    2479945 C2    4/2013
(Continued)

OTHER PUBLICATIONS

International Search Report for International Application PCT/EP2017/084220, dated May 17, 2018.
(Continued)

*Primary Examiner* — Raj Jain
(74) *Attorney, Agent, or Firm* — Marshall, Gerstein & Borun LLP

(57) ABSTRACT

The invention provides method in a mobile communication system of transmitting data wherein the data is transmitted using a modulation and coding scheme, MCS, which is reconfigurable over a MCS re-configuration cycle length and wherein the data is transmitted using a reconfigurable transmit time interval, TTI, length, the MCS reconfiguration cycle length and the TTI length being different from each other.

3 Claims, 9 Drawing Sheets

(51) Int. Cl.
*H04L 5/00* (2006.01)
*H04W 88/06* (2009.01)
*H04L 5/14* (2006.01)
*H04L 1/16* (2006.01)
*H04W 72/04* (2009.01)

(52) U.S. Cl.
CPC .......... *H04L 1/0031* (2013.01); *H04L 1/0061* (2013.01); *H04L 1/1607* (2013.01); *H04L 1/18* (2013.01); *H04L 1/1812* (2013.01); *H04L 5/0007* (2013.01); *H04L 5/0039* (2013.01); *H04L 5/0046* (2013.01); *H04L 5/0053* (2013.01); *H04L 5/0092* (2013.01); *H04L 5/0094* (2013.01); *H04L 5/143* (2013.01); *H04W 72/0406* (2013.01); *H04W 72/0446* (2013.01); *H04W 88/06* (2013.01); *H04L 1/1874* (2013.01)

(56) References Cited

U.S. PATENT DOCUMENTS

| | | | |
|---|---|---|---|
| 2008/0032744 | A1* | 2/2008 | Khan .................. H04B 7/0684 455/562.1 |
| 2010/0034158 | A1 | 2/2010 | Meylan |
| 2016/0205680 | A1* | 7/2016 | Nguyen .................. H04L 5/14 370/280 |
| 2019/0305878 | A1* | 10/2019 | Bienas ................. H04L 1/0027 |

FOREIGN PATENT DOCUMENTS

| | | |
|---|---|---|
| WO | WO-2009028512 A1 | 3/2009 |
| WO | WO-2009089287 A2 | 7/2009 |
| WO | WO-2010019522 A1 | 2/2010 |
| WO | WO-2012099401 A2 | 7/2012 |
| WO | WO-2016031343 A1 | 3/2016 |
| WO | WO-2016069378 A1 | 5/2016 |

OTHER PUBLICATIONS

Written Opinion for International Application PCT/EP2017/084220, dated May 17, 2018.
Huawei et al., "Details of two-level DCI schemes for short TTI", 3GPP Draft; Mobile Competence Centre; Oct. 9, 2016.
Nokia Alcatel-Lucent Shanghai Bell: "On two-level DL control channel design for shorter TTI operation", 3GPP Draft; Mobile Competence Centre; Nov. 13, 2016.
Nokia et al; "On two-level DL control channel design and subframe structure for shorter TTI operation", 3GPP Draft; R1-1609323; Mobile Competence Centre; Oct. 9, 2016.
Pen C Li (Philips): IEEE 802.11 TGn-Enhancements of 802.11a/g-based MIMO-OFDM System (presentation); Aug. 14, 2004.
Official Action of substantive examination for Application No. RU2019121484/07, dated Aug. 28, 2020.

* cited by examiner

MOBILE COMMUNICATION TRANSMISSION USING FLEXIBLE FRAME STRUCTURE WITH VARIABLE MCS AND TTI LENGTH

CROSS-REFERENCE TO RELATED APPLICATIONS

This is the United States national phase of International Patent Application No. PCT/EP2017/084220, filed Dec. 21, 2017, which claims priority to European Patent Application No. 16205738.4, filed Dec. 21, 2016, the entire contents of each of which are hereby incorporated by reference.

FIELD OF THE DISCLOSURE

The present invention relates to a frame structure for use in a mobile communication system for the transmission of data between a base station (eNB) and a user equipment (UE).

BACKGROUND

Mobile radio communication systems have to cope with the effects of changes to the radio channel. Therefore, several measures are applied. One of them is commonly known as link adaption or adaptive modulation and coding. The problem to be solved using such techniques is to find a trade-off between high data rate and robust transmission. A robust transmission with a low order modulation scheme and high channel coding rate is suited for bad channel conditions. A higher order modulations scheme with low channel coding rate leads to a high data rate but is not suited to cope with bad channel conditions. As radio conditions may change during transmission, it is required to monitor the channel conditions periodically and adapt the modulation and coding scheme (MCS) accordingly, if required. Nowadays the adaption takes place with a fixed periodicity, i.e. the base station indicates the used MCS in every packet of the physical channel, irrespective of whether a change is required or not. For example, in UMTS this is done once in a slot (0.666 ms), in LTE once in a subframe (1 ms). This periodicity is sufficient for all radio conditions and movement scenarios considered during the specification phase. It is obvious that there is a fixed overhead required for the MCS configuration signalling and that the maximum movement speed of mobile devices is limited by this fixed periodicity.

Further, another mechanism is used in HSPA and LTE to cope with transmission errors that may occur during transmission termed hybrid automatic repeat request (HARQ). For this, each packet contains redundant bits that enable the receiver to detect erroneous packets. These bits are commonly known as cyclic redundancy check (CRC) bits. If the receiver detects an error in the received packet based on the CRC, a so called NACK (negative acknowledgement) message is transmitted back to the transmitter to request for a retransmission. Otherwise an ACK (positive acknowledgement) message is sent back and the transmitter will continue the transmission with the next packet in the buffer. The time duration of a transmission of data including the associated CRC bits is called transmit time interval (TTI). The TTI length is strongly related to the transmission latency. Longer TTIs leads to longer latency. The TTI length in LTE is 1 ms and it is fixed. This TTI length leads to a user plane latency of 10 to 20 ms. In UMTS the TTI length is configurable between 10 and 80 ms which will lead to a user plane latency of 300 to 400 ms.

Currently the fifth generation of mobile communication is being specified by 3GPP. One requirement of the new system is more flexibility of the radio interface. It should be scalable to be efficient for services that requires ultra-low latency (e.g. 1 ms user plane latency) and also for services with very low data rates and/or very low mobility whose batteries should last for up to 10 years (e.g. smart meters). The ultra-low latency requirement needs a much shorter TTI length. The ultra-long battery lifetime requirement needs measures to reduce the signalling overhead in cases of very low data rate and very low mobility.

In general, longer TTIs save on overhead requirements for configuring the feedback procedure and save resources required to send the feedback, on the cost of a longer latency. They are well suited for low cost and power efficient low data rate communications. Shorter TTIs enable shorter latency as required e.g. for Ultra Low Latency communication, at the cost of more signalling overhead. Longer MCS re-configuration cycles will save overhead for configuring the PHY parameters, at the cost of the ability to quickly adapt to fast changing radio channels. They are well suited e.g. for low mobility devices. Shorter MCS re-configuration cycles will enable the system to adapt the transmission to fast changing radio channels, e.g. in high speed trains on the cost of more signalling overhead.

EP 2 015 601 A1 describes a method to select one out of a plurality of TTI length for an uplink shared channel and a downlink shared channel or both based on at least any of: a moving speed of a mobile terminal, location of the mobile terminal in a cell, provided throughput value, average number of retransmissions. This document does not describe how signalling for configuration of variable TTI length is done or how the resource grid is arranged in case of simultaneous transmission packets with different TTI length.

WO 2016/069378 A1 describes a frame structure offering multiple frame length. It does not describe a configurable length for the MCS re-configuration and therefore MCS adaption for different channel conditions is not possible. Further the distance of CRC bits is not configurable, and therefore the feedback cycle is not adjustable to the service needs.

It is currently not possible to adjust the rate of MCS re-configuration signalling. Therefore, the overhead required for this signalling is fixed. It is not possible to assign a longer MCS re-configuration cycle to reduce overhead when the radio conditions changes slowly or to assign a shorter MCS re-configuration cycle to allow for more accurate adaption to fast changing radio conditions.

Further, in current OFDM-based communication systems (e.g. LTE) it is not possible to adjust the TTI length to the current latency requirements. Therefore, a lower latency as required for some use cases of the $5^{th}$ generation of mobile communication systems (e.g. safety relevant vehicle-to-vehicle communication) could not be enabled with the LTE resource grid/frame structure. On the other hand, the signalling overhead required for the HARQ mechanism could not be reduced if the latency requirement of a service allows for longer latency.

3GPP document R1-1608634 from WG1 Meeting #86bis describes a two level downlink control information, DCI, scheme for short TTI. For a slow DCI scheme, the DCI including the MCS information is transmitted in a legacy PDCCH region whereas for a fast DCI scheme, the information is transmitted on the sPDCCH or a legacy PDCCH. The TTI length is always identical to the MCS re-configuration period length.

Other 3GPP documents concerning short TTI operation include R1-11609323 (also from Meeting #86bis) and R1-1612210 (Meeting #87). Aggregation of modulation and coding schemes is described in a proposal in connection with the IEEE 802.11 standard in document IEEE 802.11-04/945r0.

GENERAL DESCRIPTION

In one aspect, the present invention provides a method in a mobile communication system of transmitting data wherein the data is transmitted using a modulation and coding scheme, MCS, which is reconfigurable over a MCS re-configuration cycle length and wherein the data is transmitted using a reconfigurable transmit time interval, TTI, length, the MCS re-configuration cycle length and the TTI length being different from each other.

Further, the invention provides a communication system comprising a base station and a plurality of user equipment devices, wherein the system is arranged to provide multiple simultaneous data channels between the base station and at least one of the user equipment devices, wherein the system is enabled to configure each data channel with an individual modulation and coding scheme adaption rate.

The present invention provides a frame structure and transmission methods for a mobile communication system which will enable flexible configuration of both the MCS re-configuration cycle i.e. the ability to adapt to changes of the radio channel and of the TTI length, which is important for the transmission latency.

In a still further aspect, the present invention provides a mobile communication device arranged to receive data transmitted by a base station with a variable modulation and coding scheme, MCS, adaption rate, the data further being transmitted with a transmit timing interval, TTI, length, wherein the MCS adaption rate and the TTI length are not coupled.

The flexible TTI length enables the system to adapt the radio link to a wide range of quality of service (QoS) requirements e.g. from low data rate with ultra-low power consumption (smart meters) to high data rate (e.g. mobile interactive gaming) and ultra-reliable low-latency connections (e.g. safety relevant vehicle-to-vehicle communication) and the variable length of MCS re-configuration cycle enables the system to adapt the radio link to a wide range of radio channel conditions, e.g. from static conditions (smart meters) to high speed scenarios (up to 1000 km/h for airplane connectivity).

An important aspect of this invention is the de-coupling of TTI length and MCS reconfiguration cycle, whereas known communication systems deploy either the MCS reconfiguration cycle to be identical with the TTI, i.e. there is one piece of PHY configuration data transmitted each TTI (for LTE), or the MCS reconfiguration cycle is fixed, while only the TTI length is variable (for UMTS).

The invention enables the mobile communication system to configure the radio link to the current service needs and to the current radio channel conditions independently and individually for each connection. Therefore, the frame structure is designed to offer various lengths of MCS re-configuration cycle and various TTI lengths. Both parameters are selected by a controlling entity (which may be located in the core network (CN) or the base station (eNB)) prior to connection setup to match to the current service needs and to the current radio channel conditions. Further the controlling entity is periodically evaluating the service needs and the radio channel conditions and will re-configure the lengths in case that something has changed. This enables a wider range of provided QoS, mobility states and data rates with optimised signalling overhead for each connection.

The frame structure offers the following properties:

The MCS re-configuration period length can be configured at connection setup and re-configured when the next MCS re-configuration starts. This is advantageous, as it enables the system to continually adjust the MCS re-configuration ability to the optimal trade-of between low overhead and ability to adapt to fast changing radio conditions.

The TTI length can be configured at connection setup and re-configured when the next TTI starts. This is advantageous, as it enables the system to continually adjust the TTI length to the optimal trade-of between low overhead and low latency in case the service requirements have changed.

The TTI length and the MCS re-configuration period length can be selected independently from each other. This is beneficial, as optimal configuration is enabled for both, different radio channel properties and different latency requirements.

Simultaneous connections can use different MCS re-configuration cycle lengths and different TTI lengths. This is advantageous, as it enables the system to simultaneously serve multiple devices of different radio channel properties and latency requirements.

A single UE can be assigned to different TTI length simultaneously.

The controlling entity (which is part of the core network or of the base station or of both) is enabled to: simultaneously assign resources with different length of the MCS re-configuration periods (MRP); select the MRP length per connection based on the related radio channel conditions; simultaneously assign resources with different TTI lengths; select the TTI length per connection based on the related transmission delay/latency needs (this is new for OFDM based systems, but known for the CDMA-based UMTS); assign the MRP length and the TTI length independently from each other to a certain connection; assign the MRP length and the TTI length for each connection independent of other connections; and send resource positions for resource assignment messages and for frame layout configuration messages via SIBs The mobile device is enabled for reception and transmission with variable MRP and TTI length; to detect resource assignment messages in a multiple MRP resource grid; to receive resource positions for resource assignment messages and for frame layout configuration messages via SIBs.

The term "system information broadcast", or SIB, is used to describe known control resources in general. In legacy systems, general configuration information relevant for all or bigger subset of all UEs was often transmitted by the base station via SIBs. However, the general nature of this invention does not require the resource positions of RA and FL messages to be transported on a SIB, as long as the relevant UEs can receive the information on fixed resources, which are known by the UEs. Therefore, system information broadcast should be understood as a synonym for a resource for controlling data transmission, in short "control resources".

The future 5G systems will be designed for a larger range of different use cases, including devices of higher speed (e.g. ground-to-airplane communication with up to 1000 km/h) and services of higher reliability and with lower latency (security relevant vehicle-to-vehicle communication) on the one hand, and fixed devices and ultra-low energy consuming modes on the other hand (e.g. battery driven smart meters, whose batteries should last for up to 10 years). These new use cases require a much more flexible radio interface, e.g. as the current frame structures can't support the new latency requirements and will result in an inefficient transmission, when serving a UE in ultra-low energy mode. This invention solves the problem to provide a flexible frame structure for a mobile communication system that can provide lower latencies, a flexible adaption to a wider range of UE mobility states (from static to up to 1000 km/h) and user data rates (from low-energy mode to ultra-high data rates).

A benefit of the invention is that the frame structure enables efficient provision of a wider range of QoS requirements (especially latency and data rates) and UE mobility states, while each connection can be configured to provide the required QoS with the lowest signalling overhead for the feedback mechanism and the configuration of the modulation and coding scheme (MCS).

The frame structure of the invention offers the ability to simultaneously provide different TTI lengths adapted to the latency need of the service and different MCS re-configuration periods, which are adjusted to the radio channel conditions.

The frame structure is split in generic frame blocks (GFB). A generic frame control field (GFCF) is located at the beginning of each GFB. This field contains the resource assignment (RA) and the frame layout (FL). The resource positions of these fields are announced via System Information Broadcast and therefore each UE will quickly find its own resource assignment, even though the frame duration may change from one GFB to the next GFB.

After the GFCF, a variable number of generic frame sub blocks (GFSB), each containing multiple data channels (DCH), is located. Each GFSB is configurable with an individual bandwidth, individual amount of MCS fields (to adapt the modulation and coding of each DCH to the radio channel persistency) and one or multiple individual TTI lengths (to adapt each connection to its latency requirements). This enables a wider range of provided QoS, mobility states and data rates with optimised signalling overhead for each connection.

The eNB derives the radio channel persistency duration (RCPD) of each UE and will assign resources from the same GFB to UEs with similar RCPDs. Therefore, the number of GFSBs is smaller than an assignment to individual GFSBs for each UE and the related configuration signalling is reduced.

The eNB periodically checks for each connection, whether radio conditions or QoS requirements has changed and performs a re-configuration (i.e. selects different values for the relating parameters signalled in the FL and MCS fields) if required. Therefore, the signalling overhead for configuring the MCS and for providing HARQ feedback is always at its minimum.

BRIEF DESCRIPTION OF THE DRAWINGS

Embodiments of the present invention will now be described, by way of example only, with reference to the accompanying drawings in which.

DETAILED DESCRIPTION

Figure 1:
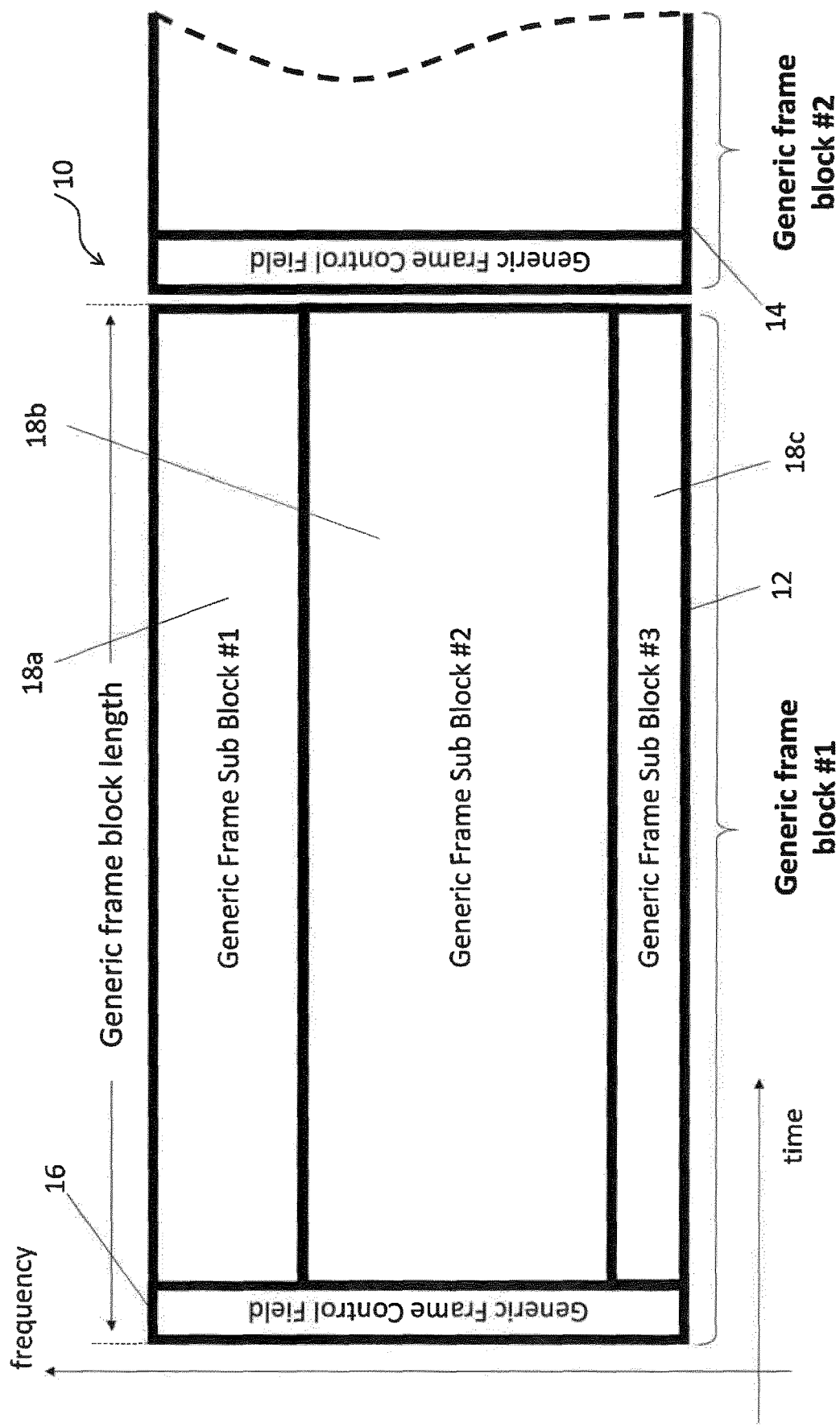
FIG. 1 shows a schematic diagram of an exemplary frame structure.

FIG. 1 shows an example of a frame structure 10 according to the invention.

The frame structure 10 is split into generic frame blocks (GFB) 12, 14. At the beginning of each block a generic frame control field 16 is located. The example in FIG. 1 shows, that this field 16 is spanning the full bandwidth. Other positions within the resource grid are also possible, e.g. using only parts of the spectrum and that this field is split into two or more sub fields.

The rest of the generic frame block 12 consists of a configurable number of generic frame sub blocks 18a, 18b, 18c, which are distributed through the available frequency spectrum. Each generic frame sub block has the same duration as the generic frame block and an individual configurable bandwidth.

In the following the content of the generic frame block is explained in more detail. For the sake of simplicity, in FIG. 2 a configuration with only one generic frame sub block for two mobile devices (UE1 and UE2) is shown.

The generic frame block consists of five different types of elements: frame layout (FL) and resource assignment (RA), which are located in the generic frame control field, and modulation and coding scheme (MCS), cyclic redundancy check (CRC) and data channel (DCH), which are part of the generic frame sub blocks. The content of these fields is listed below. The generic frame block length and the resource positions of the FL and RA fields (which are configuring the generic frame block) are semi statically configured by the base station e.g. via system information. Therefore, all UEs know prior connection setup where to find the FL and RA fields and they can quickly find its own resource assignments, even though the frame duration may change from one GFB to the next GFB. The used Modulation and Coding scheme of the RA and FL field is either static (e.g. always QPSK is used) or semi-statically configured e.g. via one or more SIBs.

Figure 2:
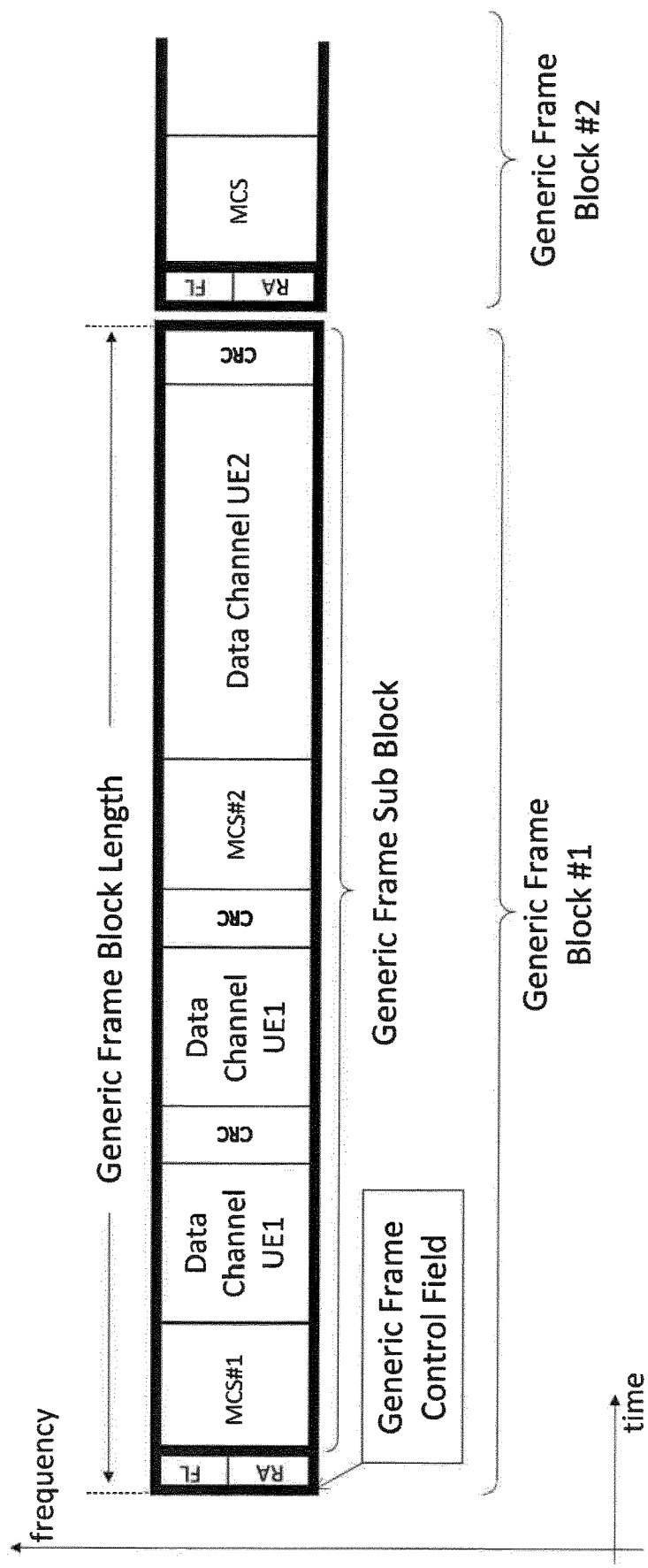
FIG. 2 shows the frame structure of FIG. 1 in more detail.
Figure 3:
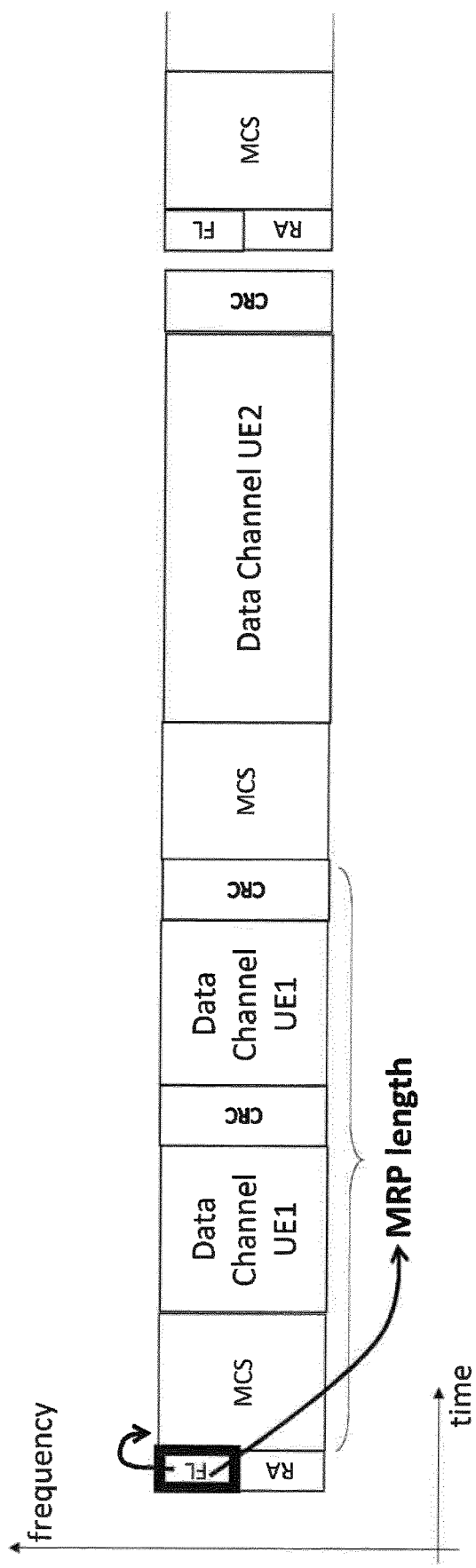
FIG. 3 illustrates information contained in a frame layout field.

The FL (frame layout) field configures the current generic frame block. It contains all information required by the receiver to find and decode the MCS field relevant for the receiving UE, i.e. the resource positions (e.g. index of first subcarrier) and sizes (Bandwidth) of this field and the distance (i.e. the time which is a distance in a graphical representation representing time) between two MCS fields (=MRP length, shown in FIG. 3). The used modulation and coding scheme of the MCS field itself, is either static and pre-known by the receiver (e.g. always QPSK is used) or semi-statically configured e.g. via a SIB (In another variant of this embodiment, the used modulation and coding scheme of the MCS field itself is part of the FL field). This information triplet (or quadruplet, if MCS of MCS field is included) is contained for each currently configured generic frame sub block. The example in FIG. 2 shows only one generic frame sub block. Therefore, only one triplet is contained there. The preferred variant of this invention is not to signal the used MCS of the MCS field within the FL field. FIG. 3 shows illustratively to which fields the contained information is related.

An example of FL field content for the example shown in FIG. 2 is given in Table 1.

TABLE 1

| Generic Frame Sub Block | First Subcarrier | Bandwidth [Subcarriers] | MRP length [ms] |
|---|---|---|---|
| 1 | 1 | 12 | 2 |

Figure 4:
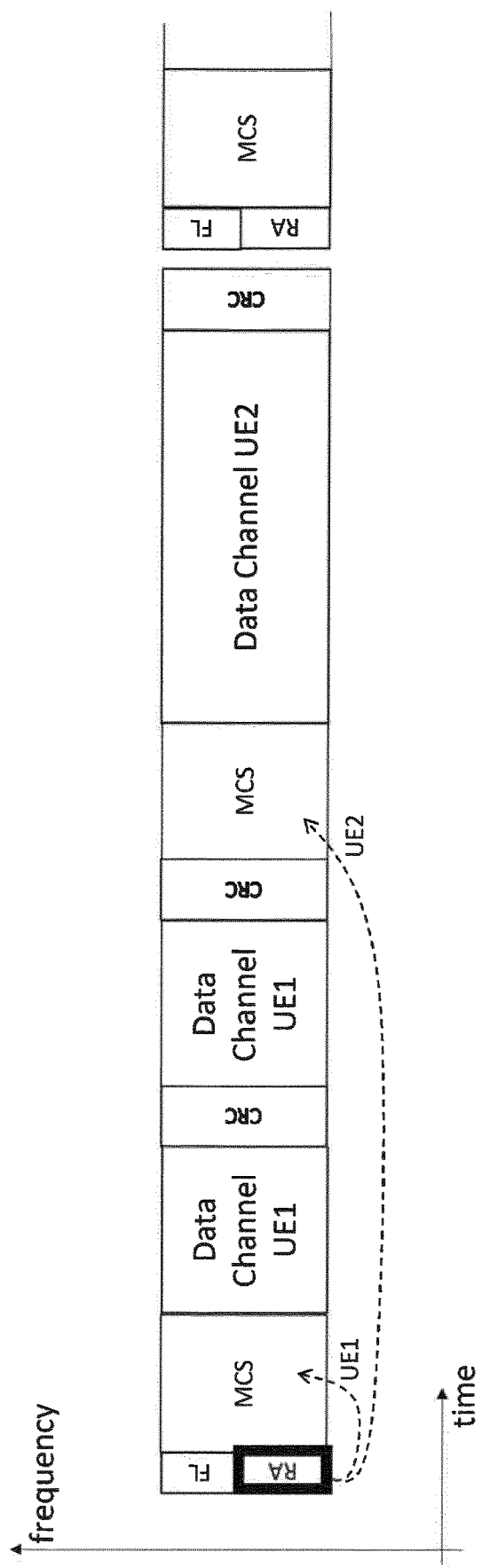
FIG. 4 illustrates information contained in a resource assignment field.

The RA field contains a mapping table of UE-IDs which are scheduled for transmission in the current generic frame block to the relevant MCS fields for each scheduled UE. FIG. 4 shows illustratively to which fields the contained information is related to.

An example of RA field content for the example depicted in FIG. 2 is given in Table 2.

TABLE 2

| Scheduled UEs | Generic Frame Sub Block | MCS field |
|---|---|---|
| UE1 | 1 | 1 |
| UE2 | 1 | 2 |

The MCS (modulation and coding scheme) field may contain the following Information:

Modulation and coding scheme applied to the subsequent data channel fields. The parameters are configured by the base station to adapt the transmission to the current radio channel properties. The signalled parameters are used by the receiver to decode the data of the data channel.

TTI-length. This field indicates the length of the TTI (cf. FIG. 5), i.e. the length of the data channel plus the CRC bits.

(Optional) In one embodiment the CRC-to-data ratio is included. With this parameter the reliability of the transmission could be adjusted. In another embodiment this ratio is not included in this field. The CRC-to-data ratio may in case either be static and known by the UEs or it is configured via system information.

Figure 5:
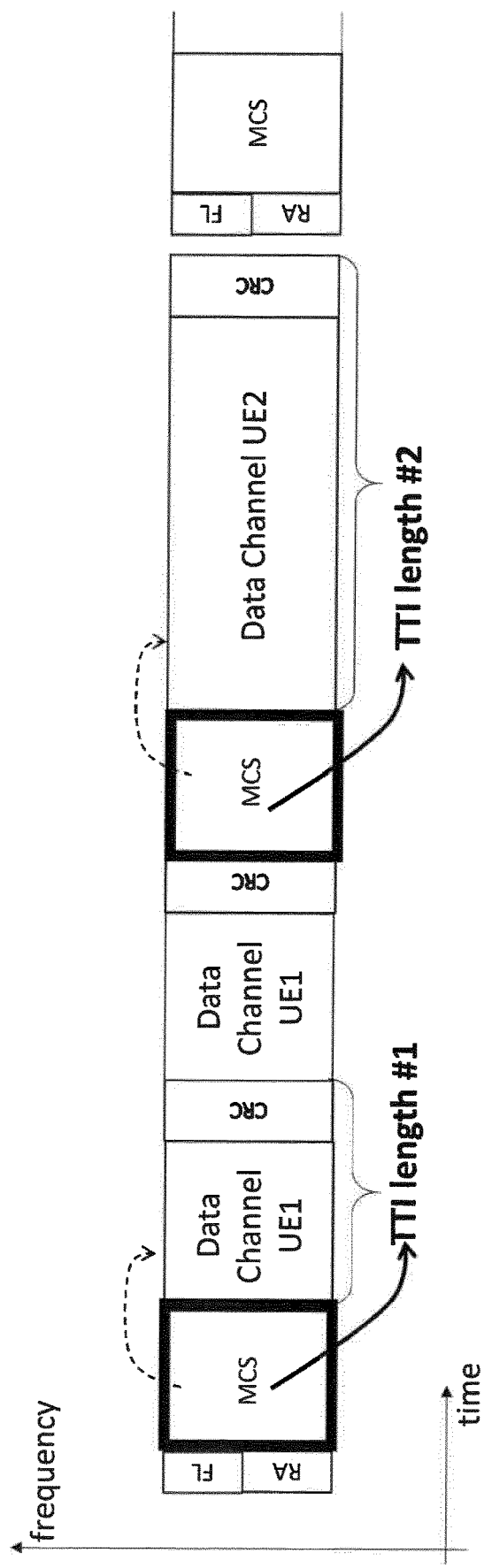
FIG. 5 illustrates information contained in an MCS field.

FIG. 5 shows illustratively to which fields the contained information is related to.

The content of MCS fields in the example depicted in FIG. 2 is given in Table 3.

TABLE 3

| TTI length | MCS | CRC-to-Data Ratio |
|---|---|---|
| | MCS#1 | |
| 0.75 ms | QPSK, Code rate 1/3 | 10% |
| | MCS#2 | |
| 1.5 ms | 16QAM, Code rate 1/3 | 5% |

The CRC field contains the cyclic redundancy check bits, which are required by the HARQ mechanism to determine correctness of the received data in order to derive the feedback information The DCH (Data Channel) field contains the user data or the higher layer data of the UE which is indicated in the relating MCS-field.

Figure 6:
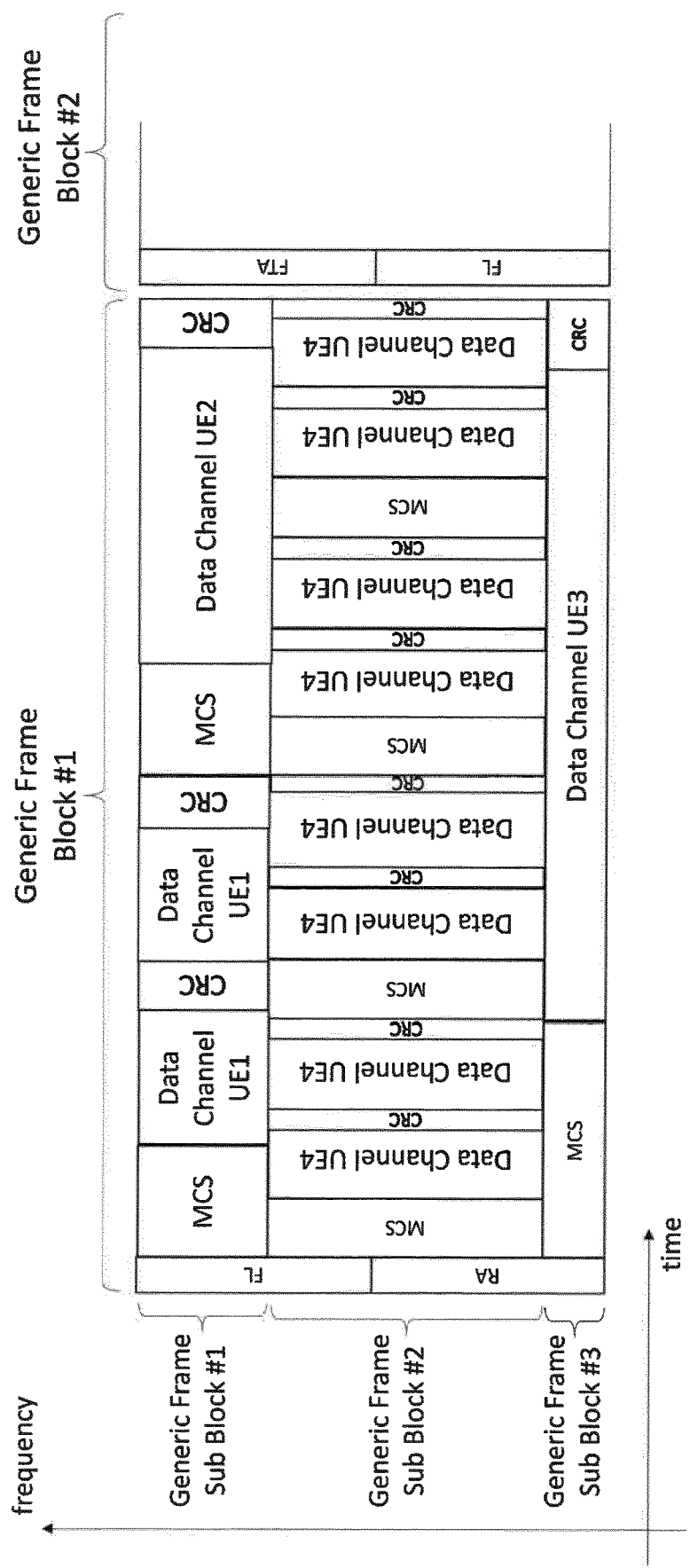
FIG. 6 shows a typical frame structure configuration.

FIG. 6 shows a further exemplary generic frame block in a more complex configuration than that of FIG. 2 to show the configuration flexibility.

The Generic Frame Block #1 in FIG. 6 is clustered in three generic frame sub blocks (GFSB). Each GFSB is configured with a different MRP length (cf. FIG. 3): GFSB #2 has a very short MRP length and is therefore able to adapt the MCS to fast changing radio conditions but also requires more signalling data (i.e. more MCS fields) which increases the signalling overhead.

GFSB #3 has a very long MRP length which results in a very low signalling overhead (i.e. only one MCS field per GFSB compared to 4 MCS fields in GFSB #2). Due to the property, that DCH resources within the same GFSB having the same ability to adapt to changes at the radio channel, the control entity will assign resources of the same GFSB to mobile devices having similar mobility states (or similar radio channel persistency durations). Tables 4 and 5 shows the content of the FL and RA fields respectively for the example GFB shown in FIG. 6.

TABLE 4

| Generic Frame Sub Block | First Subcarrier | Bandwidth [Subcarriers] | MRP length [ms] |
|---|---|---|---|
| 1 | 1 | 24 | 2 |
| 2 | 25 | 60 | 1 |
| 3 | 85 | 12 | 4 |

TABLE 5

| Scheduled UEs | Frame Sub Block | MCS field |
|---|---|---|
| UE1 | 1 | 1 |
| UE2 | 1 | 2 |
| UE3 | 3 | 1 |
| UE4 | 2 | 1, 2, 3, 4 |

Additionally, the generic frame block #1 in FIG. 6 has differently configured TTI lengths (cf. FIG. 5) for each UE. UE4 is configured with a very short TTI, and therefore the user latency is very low. On the other hand, there is additional feedback signalling required to obtain the lower latency. In contrast to this, UE3 is configured with a very long TTI which will cause very low overhead and a longer latency.

As can be seen in FIG. 6 the frame structure offers a flexible configuration of MRP length and TTI length and offers different configurations of the MRP and TTI length simultaneously.

Methods utilising the GFBs described above will now be discussed.

Figure 7:
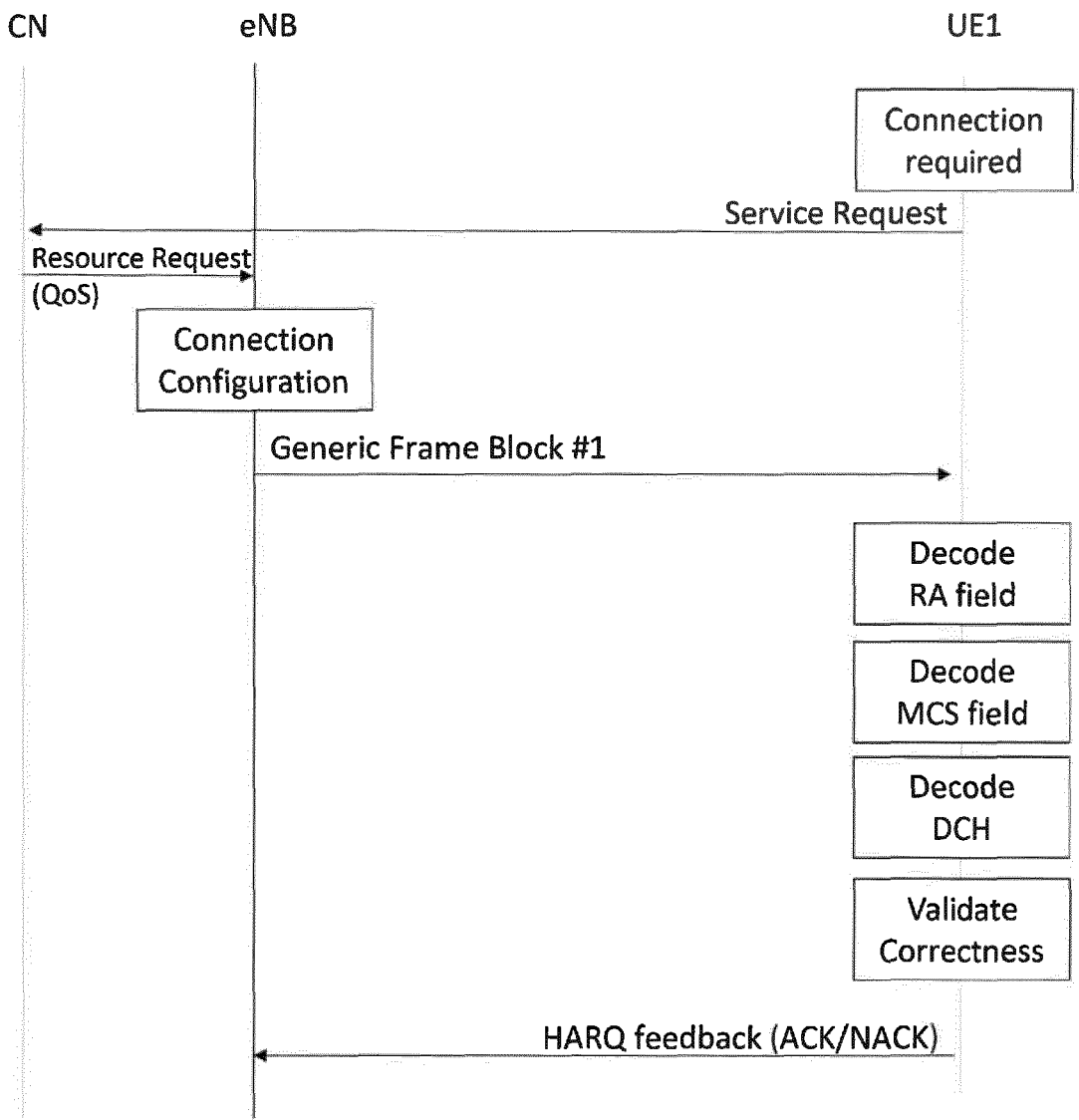
FIG. 7 shows a message flow chart for receiving data.

Firstly, it will be described how a UE will receive data. A message flow is depicted in FIG. 7 and described in the following. It is assumed, that these functions are performed in the base station (=eNB). Nevertheless, these functions can also be performed fully or partly in other elements of the mobile network. Further it is assumed, that a "service request" is transmitted by the UE to an entity in the core network, which will forward the QoS including the required latency to the eNB. It is also possible, that the UE directly transmits the requested latency to the controlling entity (either the eNB or any other entity in the core network):

The UE1 needs to connect to the network, either because the UE receives a paging message which requires a connection setup or because the user or any application on the mobile phone requires a connection.

1. UE1 transmits a Service Request message to the network and listens to the next RA fields to its own UE-ID.

2. An entity in the core network receives the Service Request and forwards a Resource Request including the required Quality of Service (QoS) to the eNB (Only performed in case that the message in step 2 is not decoded directly by the eNB).

3. The eNB (=base station) configures the connection for UE1 (as described below in connection with FIG. 8). The configuration as for UE1 in FIG. 6 is assumed.

4. The eNB transmits the following configuration to the UE1 in GFB #1: the UE-ID of UE1 together with generic frame sub block #1 and MCS field #1 in the RA field (cf. Table 2), the FL field according to Table 4, the MCS field #1 in GFB #1 according to MCS #1 in Table 3, and further, the base station transmits the user data in the data channel field assigned to UE1

5. The UE decodes the RA field of GFB #1 and finds its own UE-ID and the resource assignment to MCS #1 in GFSB #1. This triggers UE1 to decode the related MCS field.

The UE reads MCS #1 in GSFB #1 and decodes the data channel according to the contained parameters. The UE then validates the correctness of the data by using the CRC bits.

6. If the data was received correctly, the UE transmits an "ACK" back to the base station, otherwise it transmits a "NACK".

Figure 8:
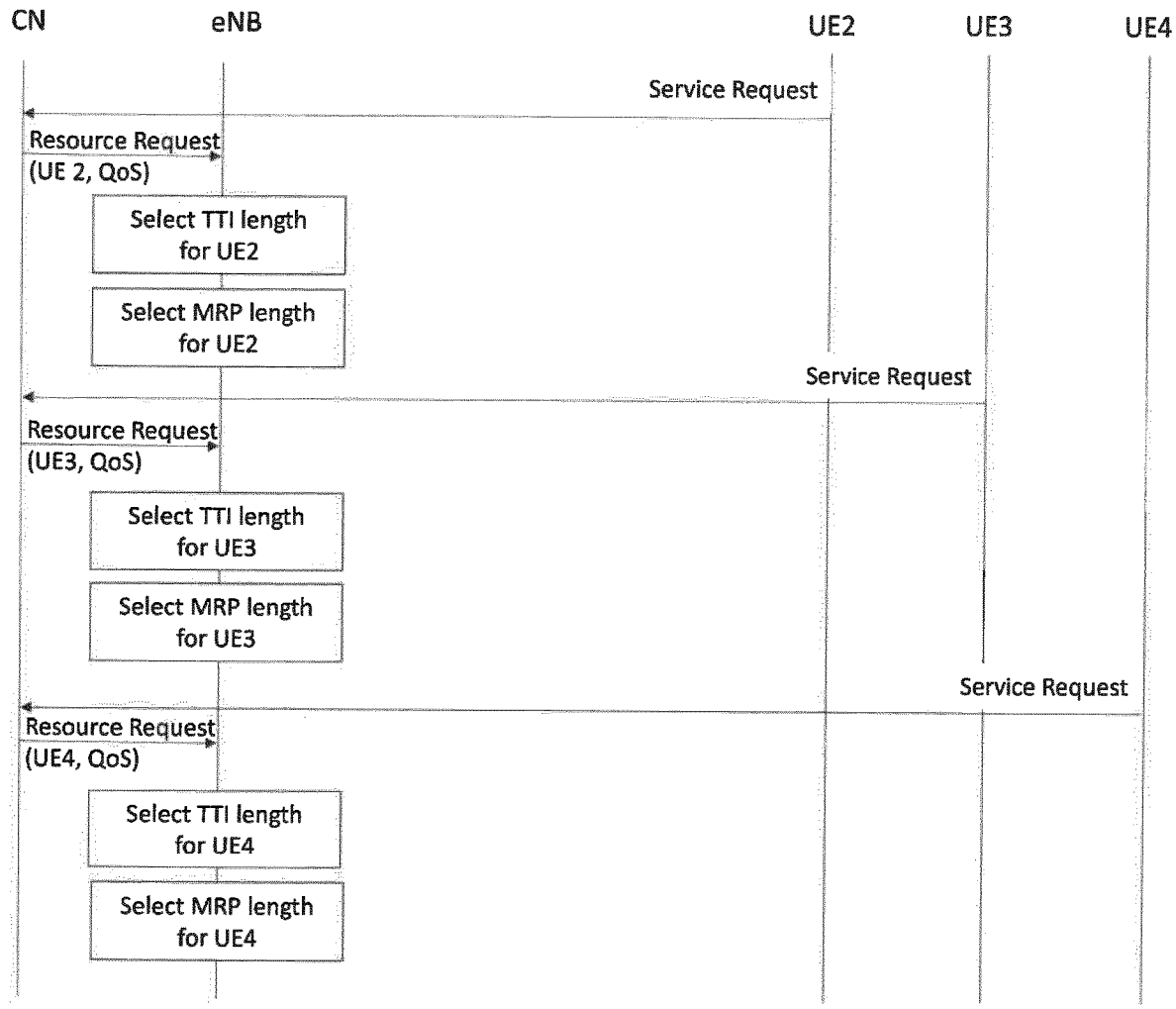
FIG. 8 shows a message flow chart for configuring the frame structure.

In a further method, illustrated by FIG. 8, an eNB configures the GFB. The message flow is depicted in FIG. 8 and described in the following.

1. The core network receives a service request from each of UEs UE2, UE3 and UE4. The core network derives quality of service (QoS) parameters from the service request, the current UE context, current network policy potentially taking into account subscriber information. These QoS parameters include the desired latency (e.g. maximum user plane latency). In another variant of this embodiment, this step is performed by the eNB.

2. (Only performed in case that the message in step 1 is not decoded directly by the eNB) The core network orders the radio access network, e.g. the serving eNB, to setup the radio resources taking the derived QoS parameters into account.

3. For each UE the eNB derives the TTI length from the latency indication in the QoS parameters. It may consider additional Information like the current latency in the core network. The eNB selects the longest TTI that will enable the desired latency to reduce the overhead to a minimum. In this example, the eNB selects a TTI length of 1.5 ms for UE2, 3 ms for UE3 and 0.333 ms for UE4 (Cf. Table 6 and FIG. 9).

Figure 9:
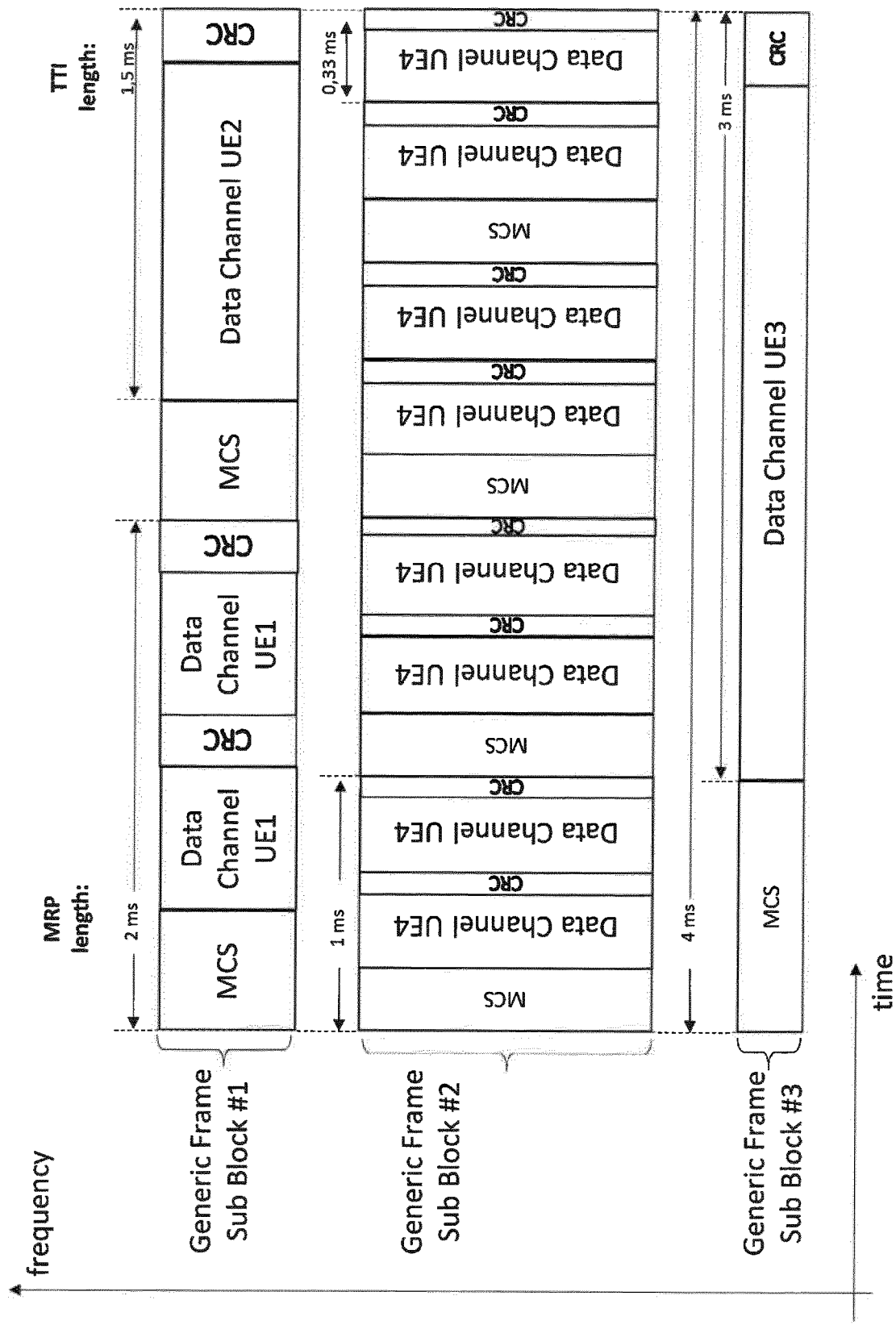
FIG. 9 shows a generic frame block with MCS reconfiguration periods and TTI lengths.

4. For each UE the eNB derives a radio channel persistency duration, i.e. how long the radio channel parameters (e.g. attenuation of the relevant subcarriers) are almost unchanged, so that the selected modulation and coding scheme is still optimal after expiration of this radio channel persistency duration. The eNB may use information received from the UEs, e.g. the received random access preamble or other uplink messages or signals. Based on this duration, the eNB selects a MRP length that is slightly below. This ensures that the resources are used optimally and the overhead is as low as possible. In this example the eNB selects the MRP values according to Table 6. The values of the MRP and TTI lengths are also depicted in FIG. 9.

5. The eNB transmits the next GFB.

6. The eNB periodically monitors the radio channel conditions and the obtained and requested latency values and adapts the MRP and TTI length if needed.

TABLE 6

| Generic Sub Frame Block | MRP length | TTI length in MCS#1 | TTI length in MCS#2 |
| --- | --- | --- | --- |
| 1 | 2 ms | 0.75 ms | 1.5 ms |
| 2 | 1 ms | 0.33 ms | — |
| 3 | 4 ms | 3 ms | — |

The following summarizes how the present invention differs from the known techniques.

The invention enables the simultaneous use of different MCS adaption rates in a single cell (on a single radio or frequency resource), depending on the individual (i.e. UE specific) radio channel persistency duration. Where a single UE has the same radio channel persistency duration on all its connections to a single base station, this aspect can be limited to usage of multiple MCS adaptions rates within a cell towards different UEs.

The invention enables the simultaneous use of different TTI length in a single OFDM-based cell, depending on the individual service needs. Where a single UE offers different services simultaneously, e.g. a file download and gaming, different simultaneous TTIs may apply to different UEs as well as to the same UE.

Particularly beneficial aspects of the invention include the following.

A mobile communication system enabled to provide multiple simultaneous connections between a base station and multiple mobile communication devices, whereas each connection may be configured with an individual MCS adaption rate (matching the current radio channel persistency duration).

The mobile communication system may be enabled to select the individual MCS adaption rate to match the current radio channel persistency duration of the related mobile device.

The communication system may be enabled to periodically check the radio conditions of the connected devices and perform a re-configuration of the MCS adaption rate if needed.

Further, the communication system may be enabled to signal the resources used for Resource Assignment and for frame layout configuration via pre-known control resources.

An entity controlling the mobile radio resources, enabled to derive the radio channel persistency duration of each UE and to configure the MCS adaption rate according to the radio channel persistency duration.

A mobile communication device, enabled to receive data sent with a variable MCS adaption rate (the actually used MCS adaption rate being configured by an entity controlling the mobile radio resource)

The mobile communication device may be enabled to receive data with an MCS adaption rate simultaneously with other mobile communication devices which receive data with a different MCS adaption rate.

Furthermore, the mobile communication device may be enabled to receive resource positions for resource assignment messages and for frame layout configuration messages via pre-known control resources.

An OFDM-based mobile communication system enabled to provide multiple simultaneous connections between a base station and multiple mobile communication devices, whereas each connection may be configured with an individual TTI length The OFDM-based mobile communication system may be enabled to select the TTI length matching the current QoS needs of the related service In addition, the OFDM-based mobile communication system is enabled to periodically check the latency requirements of the connection and performs a re-configuration of the TTI length if required.

The OFDM-based mobile communication system may further be enabled to signal the resources used for Resource Assignment and for frame layout configuration via pre-known control resources.

In addition, the OFDM-based mobile communication system may be enabled to provide multiple connections between the base station and a single mobile communication device with different TTI lengths (matching the QoS needs of different services provided by the single mobile communication device).

An entity controlling the OFDM-based mobile radio resources, enabled to derive the required TTI length of each radio connection and configure the TTI length for each radio connection according to the required TTI length.

A OFDM-based mobile communication device, enabled to receive data send with variable TTI lengths (the actually used TTI length being configured by an entity controlling the mobile radio resource.)

The OFDM-based mobile communication device may be enabled to receive data with different TTI lengths on the same radio resource.

In addition, the OFDM-based mobile communication device may be enabled to receive data with a TTI lengths on a radio resource on which other mobile communication devices receive data with a different TTI length.

The OFDM-based mobile communication device may be enabled to receive resource positions for resource assignment messages and for frame layout configuration messages via pre-known control resources.

In a still further aspect, the invention provides a communication system enabled to configure a used modulation and coding scheme of a data channel, wherein a used modulation and coding scheme for the transmission of a modulation and coding scheme signalling of the data channel is signalled on pre-known resources to associated mobile devices.

The invention claimed is:

1. A method in an orthogonal frequency division multiplexed mobile communication system of transmitting data, the method comprising:
    transmitting the data using a modulation and coding scheme, MCS, which is reconfigurable over a MCS re-configuration cycle length and wherein the data is transmitted using a reconfigurable transmit time interval, III, length, the MCS re-configuration cycle length and the TTI length being different from each other, wherein the data is transmitted in a data frame and wherein the frame has a frame structure comprising a data frame block, the data frame block comprising:
    at least one frame control field;
    at least one frame sub-block, each sub-block comprising:
        user data;
        information as to the MCS for the user data;
        a TTI indicator; and
        user data verification information.

2. The method according to claim 1, wherein the data frame further includes information indicating a separation between successive information fields containing the MCS information.

3. A method in an orthogonal frequency division multiplexed mobile communication system of transmitting data, the method comprising:
    transmitting the data using a modulation and coding scheme, MCS, which is reconfigurable over a MCS re-configuration cycle length and wherein the data is transmitted using a reconfigurable transmit time interval, III, length, the MCS re-configuration cycle length and the III length being different from each other, wherein the data is transmitted in a data frame and wherein within the data frame, data is transmitted simultaneously in a plurality of data channels with data in a first data channel being transmitted with a first modulation and coding scheme adaption rate and data in a second data channel is transmitted with a second modulation and coding scheme adaption rate different to the first modulation and coding scheme.

* * * * *